US008908272B2

(12) United States Patent
Ezawa

(10) Patent No.: US 8,908,272 B2
(45) Date of Patent: Dec. 9, 2014

(54) IMAGE BLUR CORRECTING DEVICE AND IMAGE PICKUP DEVICE

(75) Inventor: Hiroshi Ezawa, Yokohama (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/194,309

(22) Filed: Jul. 29, 2011

(65) Prior Publication Data
US 2012/0075700 A1 Mar. 29, 2012

(30) Foreign Application Priority Data

Jul. 29, 2010 (JP) ................................. 2010-171053

(51) Int. Cl.
G02B 27/64 (2006.01)
H04N 5/232 (2006.01)
G03B 5/00 (2006.01)

(52) U.S. Cl.
CPC ....... *H04N 5/23254* (2013.01); *H04N 5/23287* (2013.01); *G03B 2205/0038* (2013.01); *G03B 2205/0069* (2013.01); *G03B 5/00* (2013.01); *G02B 27/646* (2013.01)
USPC ........................................... 359/554; 396/55

(58) Field of Classification Search
USPC ......... 359/554–557, 813–814, 819, 822–824; 396/52–55; 369/44.17, 44.14, 44.15, 369/44.16, 44.21, 44.28, 44.32
See application file for complete search history.

(56) References Cited

U.S. PATENT DOCUMENTS

| 7,692,687 B2 | 4/2010 | Seo | |
|---|---|---|---|
| 2007/0242938 A1* | 10/2007 | Uno et al. | 396/55 |
| 2007/0297781 A1* | 12/2007 | Kitano | 396/55 |
| 2009/0128637 A1* | 5/2009 | Noji | 348/208.1 |
| 2009/0128928 A1* | 5/2009 | Ito | 359/814 |
| 2009/0129764 A1* | 5/2009 | Hayashi et al. | 396/55 |
| 2009/0180769 A1* | 7/2009 | Mizuta | 396/55 |
| 2009/0208196 A1* | 8/2009 | Ohno et al. | 396/55 |
| 2010/0013939 A1* | 1/2010 | Ohno et al. | 348/208.5 |
| 2010/0171864 A1* | 7/2010 | Ito | 348/335 |
| 2010/0239237 A1* | 9/2010 | Lee et al. | 396/55 |
| 2011/0044672 A1* | 2/2011 | Ito | 396/55 |

FOREIGN PATENT DOCUMENTS

JP 2005-351917 12/2005

OTHER PUBLICATIONS

Chinese Office Action, dated Aug. 5, 2013, issued in corresponding Chinese Patent Application No. 201110214320.3.
Chinese Office Action, dated Jan. 30, 2014, issued in corresponding Chinese Patent Application No. 201110214320.3.

* cited by examiner

Primary Examiner — Alicia M Harrington
Assistant Examiner — Marin Pichler
(74) Attorney, Agent, or Firm — Kenyon & Kenyon LLP

(57) ABSTRACT

Provided is an image blur correcting device, including: an image pickup element (42); an image pickup element holder (41) movable in an X direction and in a Y direction orthogonal to the optical axis, and has the image pickup element placed thereon in such a manner that two mutually orthogonal sides extend along the X direction and the Y direction; a frame-like base (31) for supporting the image pickup element holder (41) in a movable manner in the X direction and in the Y direction; and first and second electromagnetic drive means, each arranged on sides extending along Y direction of the image pickup element (41), formed of coils (45a, 45b, 46a, 46b) and magnets (47a, 47b, 48a, 48b) for driving the image pickup element holder (41), with respect to the base (31), in the X direction and in the Y direction.

4 Claims, 13 Drawing Sheets

IMAGE BLUR CORRECTING DEVICE AND IMAGE PICKUP DEVICE

CROSS REFERENCE

The present application claims the priority of Japanese Patent Application No. 2010-171053 filed on Jul. 29, 2010, the content of which is incorporated herein by reference.

TECHNICAL FIELD

The present invention relates to an image blur correcting device for correcting image blur by displacing an image pickup element, and an image pickup device provided with the image blur correcting device.

RELATED ART

Conventionally, there has been known an image blur correcting device for use in an image pickup device such as a camera, which displaces an image pickup element according to an amount of image blur detected during image taking, to thereby reduce the development of image blur on an imaging surface resulting from camera shake or the like.

There has been known a mechanism for displacing an image pickup element. The mechanism includes a first stage displaceable, with respect to a base, in a first direction perpendicular to an optical axis of an image pickup lens and a second stage displaceable, with respect to the first stage, in a second direction perpendicular to the optical axis direction of the image pickup lens and to the first direction, with the image pickup element being placed on the second stage, to thereby displace the image pickup element in a plane parallel to the base. However, when such a mechanism is employed, the configuration becomes complicated while a device including the driving mechanism apt to be increased in size. In addition, rotation in the plane parallel to the base still cannot be corrected with such a mechanism.

Meanwhile, there has also been known a method that involves supporting a movable member that has an image pickup element placed thereon, in such a manner that the movable member is translatable and rotatable in a plane parallel to a light receiving surface of the image pickup element, with respect to a fixed member fixed to a camera main body, and employing, for example, a voice coil motor (hereinafter, referred to as VCM) as an actuator for displacing and driving the image pickup element, so as to displace the movable member, to thereby correct image blur (see, for example, JP 2005-351917 A).

DISCLOSURE OF THE INVENTION

Means for Solving the Problem

In order to attain the above-mentioned object, an image blur correcting device according to a first aspect of the present invention includes:

an image pickup element having a rectangular external shape;

a movable member that is capable of moving in a first direction orthogonal to an optical axis of an image pickup lens and in a second direction orthogonal to the optical axis and to the first direction, and has the image pickup element placed thereon in such a manner that two mutually orthogonal sides of the external shape extend along the first direction and the second direction;

a fixed member for supporting the movable member in a movable manner in the first direction and in the second direction; and first electromagnetic drive means and second electromagnetic drive means each for driving the movable member, with respect to the fixed member, in the first direction and in the second direction, in which the first electromagnetic drive means and the second electromagnetic drive means are each arranged on sides of the image pickup element, the sides extending along the second direction, when viewed in a direction perpendicular to a light receiving surface of the image pickup element.

According to a second aspect of the present invention, the image blur correcting device according to the first aspect includes a plurality of each of the first electromagnetic drive means and the second electromagnetic drive means, in which at least one of the plurality of electromagnetic drive means and at least one of the plurality of electromagnetic drive means are arranged on each of both sides along the second direction of the image pickup element.

According to a third aspect of the present invention, the image blur correcting device according to the second aspect includes two each of the first electromagnetic drive means and the second electromagnetic drive means, in which ones of the first electromagnetic drive means and the second electromagnetic drive means are arranged side by side in the second direction while the other ones of the the first electromagnetic drive means and the second electromagnetic drive means are arranged at positions point-symmetrical to the ones of the first electromagnetic drive means and the second electromagnetic drive means, with respect to the center of the image pickup element, and in which the positions at which the first electromagnetic drive means and the second electromagnetic drive means are arranged both fall within a width of the external shape of the image pickup element in the second direction.

According to a fourth aspect of the present invention, in the image blur correcting device according to the second aspect, the first electromagnetic drive means is provided with a first coil disposed on the movable member and first magnets formed of a plurality of permanent magnets which are disposed on the fixed member so as to be opposed to the first coil and are arranged side by side in the first direction as being subjected to heteropolar bonding, and the second electromagnetic drive means is provided with a second coil disposed on the movable member and second magnets formed of a plurality of permanent magnets which are disposed on the fixed member so as to be opposed to the first coil and are arranged side by side in the second direction as being subjected to heteropolar bonding.

According to a fifth aspect of the present invention, in the image blur correcting device according to the first aspect, the fixed member has a plurality of guide shafts, the movable member has a plurality of bearing portions having the plurality of guide shafts passed therethrough, and the bearing portions abut to outer peripheries of the guide shafts at three points, so that the fixed member slidably supports the movable member.

According to a sixth aspect of the present invention, the image blur correcting device according to the fourth aspect includes:

a first Hall element disposed on the movable member so as to be opposed to any of the first magnets; and a second Hall element disposed on the movable member so as to be opposed to the second magnet, in which the any of the first magnets includes a plurality of permanent magnets subjected to heteropolar bonding, the permanent magnets being different in number from other ones of the first magnets; and in which the first coil being opposed to the any of the first magnets coincides, in the center thereof, with a position of an end surface a magnet of the any of the first magnets.

In order to attain the above-mentioned object, an invention of an image pickup device according to a seventh aspect includes a detector for detecting camera shake; and the image blur correcting device according to claim 1, in which the first electromagnetic drive means and the second electromagnetic drive means are controlled based on an output from the detector.

BEST MODES FOR CARRYING OUT THE INVENTION

In the following, embodiments of the present invention are described with reference to the accompanying drawings.

<First Embodiment>

Figure 1:
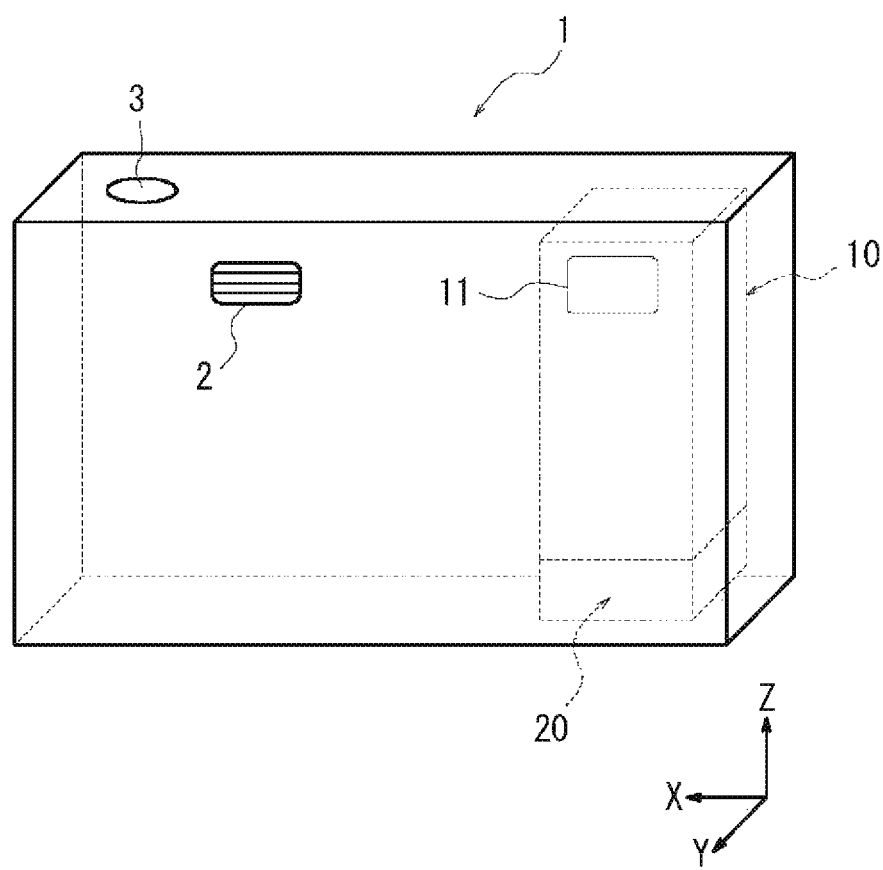
FIG. 1 is a schematic perspective view illustrating an image pickup device to which an image blur correcting device according to a first embodiment of the present invention is applied.

FIG. 1 is a schematic perspective view illustrating an image pickup device (camera) to which an image blur correcting device according to a first embodiment of the present invention is applied.

The image pickup device 1 is a compact type digital camera, and includes a flash 2, a lens aperture 11, and a release button 3 to be used by a user to instruct image taking. In the front view direction, the flash 2 is provided in the vicinity of the upper center on the front surface, the lens aperture 11 is provided on the upper right on the front surface, and the release button 3 is provided on the upper left.

Further, an image pickup lens unit 10 and an image blur correcting device 20 are provided inside a casing on the front right of the image pickup device 1. The image pickup lens unit 10 is provided with a bending optical system for bending light from the object that has entered through the lens aperture 11 toward the bottom face of the image pickup device 1 with the aid of a prism (not shown), so that the light is imaged onto a light receiving surface of an image pickup element (CCD) disposed in the image blur correcting device 20.

The image blur correcting device 20 is provided with an image pickup element and an image pickup element driving mechanism, which serves a function of correcting image blur by displacing the image pickup element (CCD) based on an amount of image blur detected during image taking. This function is described in detail below.

In the following description, an optical axis direction of the bending optical system in the image pickup lens unit 10 is defined as Z direction. The Z direction coincides with a substantially vertical direction when a user holds the image pickup device to take an image. Further, the front direction of the image pickup device 1 is defined as Y direction. The Y direction is orthogonal to the Z direction. Further, a direction orthogonal to both of the Z direction and the Y direction, that is, a horizontal direction (lateral direction) of the image pickup device 1 which is held by a user for image taking is defined as X direction. The light receiving surface of the image pickup element in the image blur correcting device 20 becomes parallel to the XY plane.

Further, a control circuit for controlling the image pickup device and performing image processing and compressing processing, a memory such as an SDRAM, a circuit board having a power circuit mounted thereon, a battery, and a detector such as a gyro sensor for detecting an image blur state (none of which are shown) are incorporated on the left of the image pickup lens unit 10 and the image blur correcting device 20 in the front view direction of the image pickup device 1. On the rear side of the image pickup device, a liquid crystal display (not shown) is disposed. These elements have no particular difference in configuration from those of a known image pickup device, and therefore the description thereof is omitted.

Figure 2:
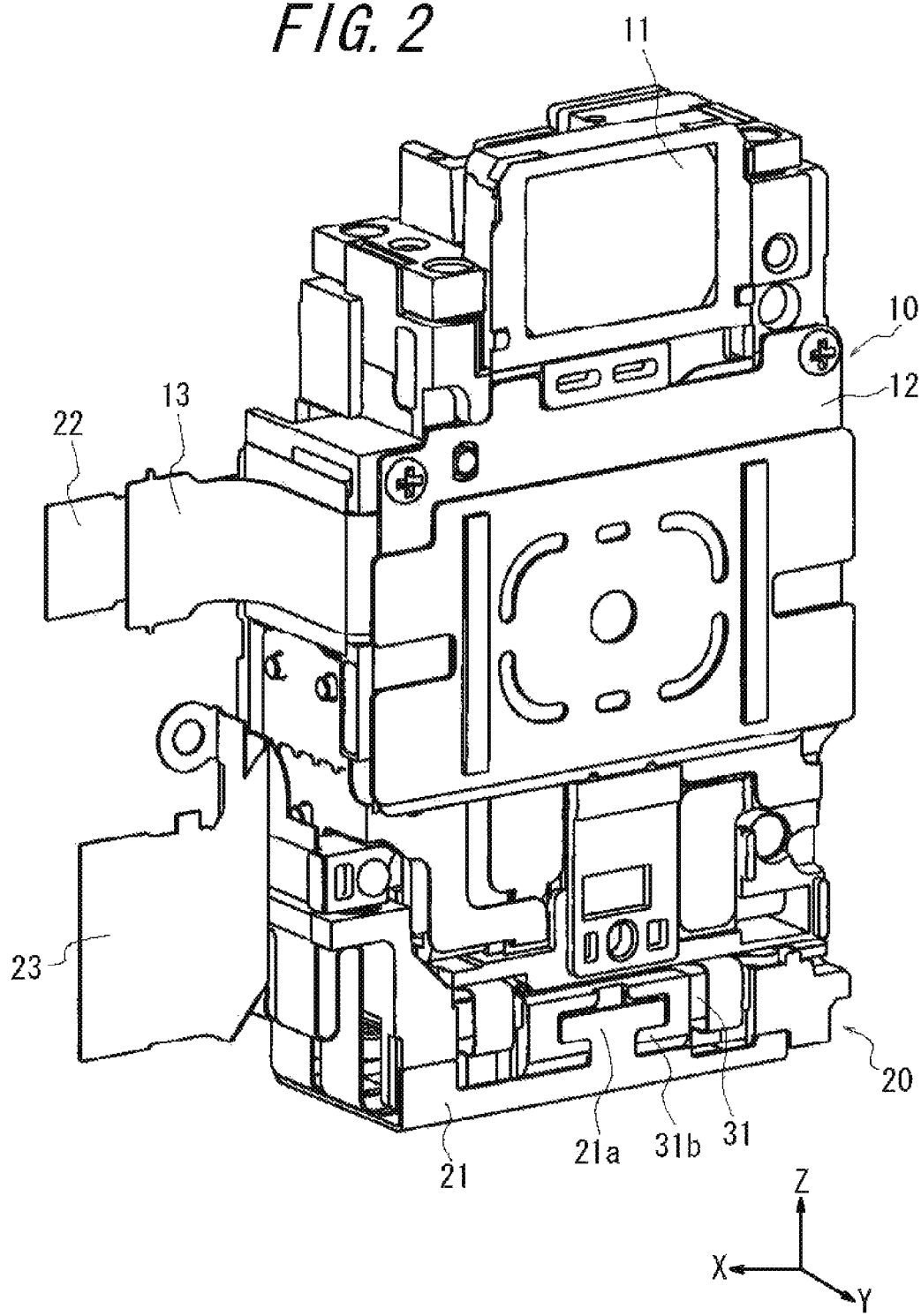
FIG. 2 is a perspective view illustrating a state of assembly of an image pick up lens unit and the image blur correcting device of the image pickup device of FIG. 1.
Figure 3:
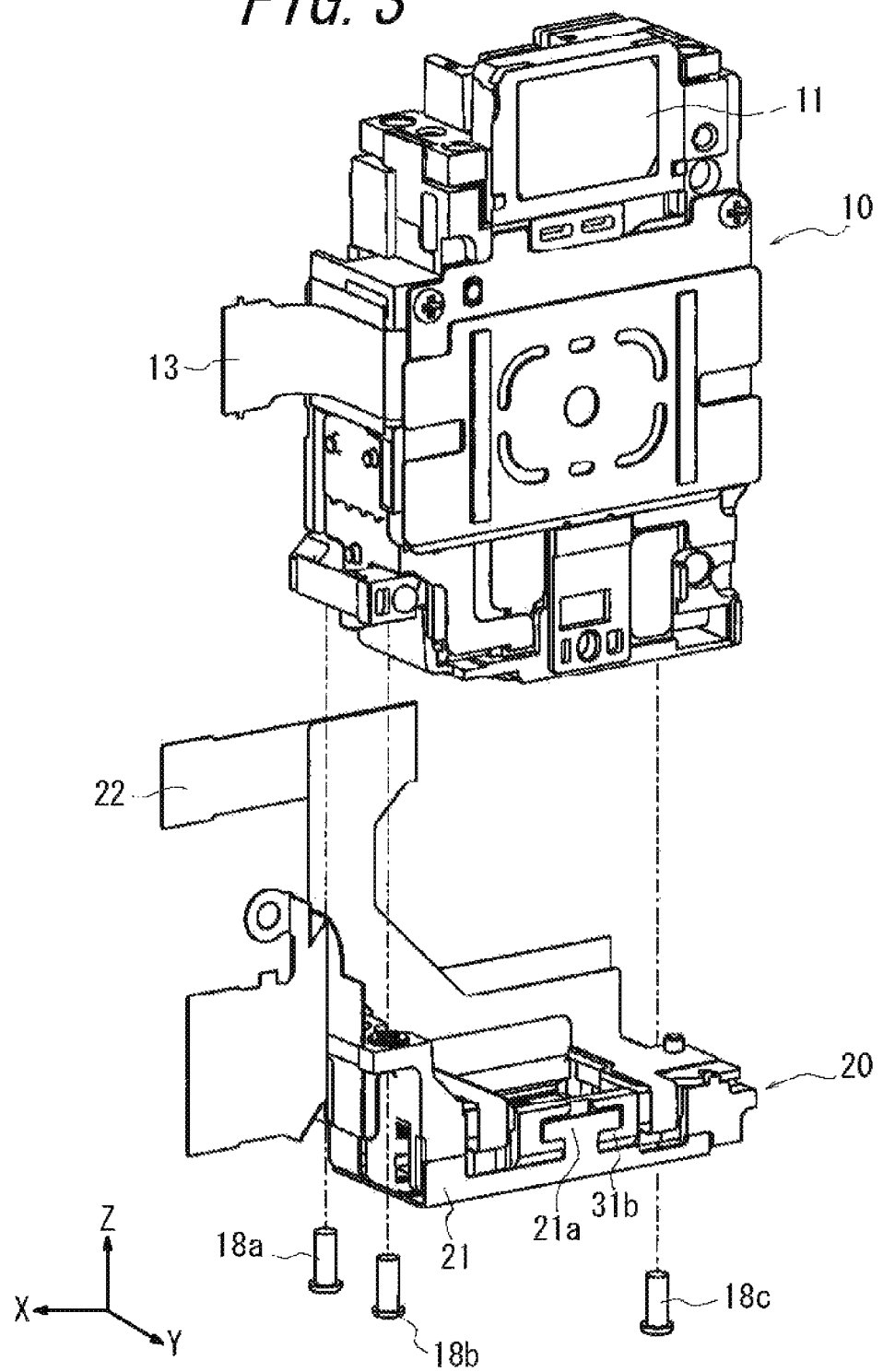
FIG. 3 is a perspective view illustrating a state where the image pickup lens unit and the image blur correcting device of the image pickup device of FIG. 1 are detached from each other.

FIG. 2 is a perspective view illustrating a state of assembly of the image pick up lens unit 10 and the image blur correcting device 20 of FIG. 1, and FIG. 3 is a perspective view illustrating a state where the image pickup lens unit 10 and the image blur correcting device 20 are separated from each other. The image pickup lens unit 10 includes a mirror frame 12 for accommodating a bending optical system (not shown). The bending optical system includes a plurality of lens groups and drive means for driving these lens groups to an optical axis direction. The lens arrangement in the bending optical system is set appropriately by a control circuit (not shown) of the image pickup device depending on the image taking conditions. Further, the image pickup lens unit 10 is connected to a circuit board via a flexible printed circuit board 13.

The image blur correcting device 20 is mounted on the downside of the image pickup lens unit 10 with the aid of screws 18a to 18c. In the following, with reference to FIGS. 4 to 9, a configuration of the image blur correcting device 20 is described.

The image blur correcting device 20 includes a fixed member 30 to be fixed and supported by the image pickup lens unit 10 with the aid of the screws 18a to 18c and the screw holes 19a, 19b, and a movable member 40 configured by including an image pickup element (CCD) 42 and an electromagnetic drive means.

The fixed member 30 includes a base 31 as a frame-like member having an opening 31a, first magnets 47a, 47b for X-direction driving, second magnets 48a, 48b for Y-direction driving, yokes 51a, 51b formed of iron as a magnetic body, and a cover 21 formed of a stainless steel having a magnetic property for covering a bottom face of the image blur correcting device 20.

The base 31 is a frame-like member which is substantially rectangular in shape when viewed in the Z direction, with an essential part being substantially parallel to the XY plane, and has the opening 31a in the center thereof for transmitting light from the object. The opening 31a is positioned in such a manner that an optical axis of the bending optical system passes through substantially the center thereof in a state where the fixed member 30 is coupled to the image pickup lens unit 10. Further, one of the end portions in the X direction (on the left side when the image pickup device is viewed from the front) of the base 31 extends upward and outward, on which the screw holes 19a, 19b for fixing the base 31 to the image pickup lens unit 10 are formed.

Further, in the center of the base 31 in the X direction, fitting portions 31b, 31c each having a concave portion having are arranged as being opposed to each other in the Y direction across the opening 31a, so that fitting pieces 21a, 21b of the cover 21 are fit in the concave portions of the fitting portions 31b, 31c, respectively.

Further, on the same side of the base 31 in the X direction as the screw holes 19a, 19b are formed, two opposing plate-like portions extend downward from both of the edge portions in the Y direction. Shaft holes 31d, 31e are formed in the two opposing plate-like portions, respectively, and a suspension shaft 31g to serve as a guide shaft is inserted through in the Y direction between these shaft holes 31d, 31e so as to be fixed and supported.

On the other hand, the other end portion of the base 31 in the X direction opposite to the side on which the shaft holes 31d, 31e are formed extends downward, and has a shaft hole 31f formed in the center thereof in the Y direction, through which a suspension shaft 31h to serve as another guide shaft is inserted. The suspension shaft 31h is fixed and supported as being protruding toward a space in the inward direction of the base 31.

The first magnets 47a, 47b for X-direction driving and the second magnets 48a, 48b in Y-direction driving are each arranged in a diagonal positions in the opening 31a of the base 31, across a space where light from the object passes through. The first magnets 47a, 47b and the second magnets 48a, 48b generate an electromagnetic drive force for displacing the movable member, in cooperation with first coils 45a, 45b for X-direction driving and second coils 46a, 46b for Y-direction driving, which are to be described later.

The yokes 51a and 51b are firmly adhered in such a manner that the yoke 51a covers the upper side (in the Z direction) of the first magnet 47a and the second magnet 48b, and the yoke 51b covers the upper side of the first magnet 47b and the second magnet 48a, so as to prevent the leakage of a magnetic flux of the first magnets 47a, 47b and the second magnets 48a, 48b, to thereby increase the magnetic flux density to act on the first coils 45a, 45b and the second coils 46a, 46b. Further, the yokes thus provided prevent the leakage flux of the first magnets 47a, 47b and the second magnets 48a, 48b from affecting the operation of a CPU in the image pickup device, and also avoids the occurrence of failure due to the magnetic flux leaking outside the image pickup device. Similarly, the cover 21 also avoids the occurrence of failure due to the magnetic flux leaking outside the image pickup device.

The movable member 40 includes an image pickup element holder 41 having a substantially rectangular flat shape in the XY direction, a cover glass 43 disposed so as to cover the image pickup element 42 (CCD) and a light receiving surface of the image pickup element 42, a cover glass sheet 44, the first coils 45a, 45b for X-direction driving, the second coils 46a, 46b for Y-direction driving, a first Hall element 49a for position detection in the X direction, and second Hall elements 50a, 50b for position detection in the Y direction.

The image pickup element holder 41 includes a window portion 41a formed correspondingly to the light receiving surface of the image pickup element 42. Further, on both sides of the image pickup element holder 41 in the X direction across the window portion 41a, fitting convex portions $41b_1$, $41b_2$, and fitting convex portions $41b_3$, $41b_4$ protruding upward from the image pickup element holder 41 are formed so as to be fit in the first coils 45a, 45b and the second coils 46a, 46b, respectively, for the purpose of fixing these coils.

Figure 8:
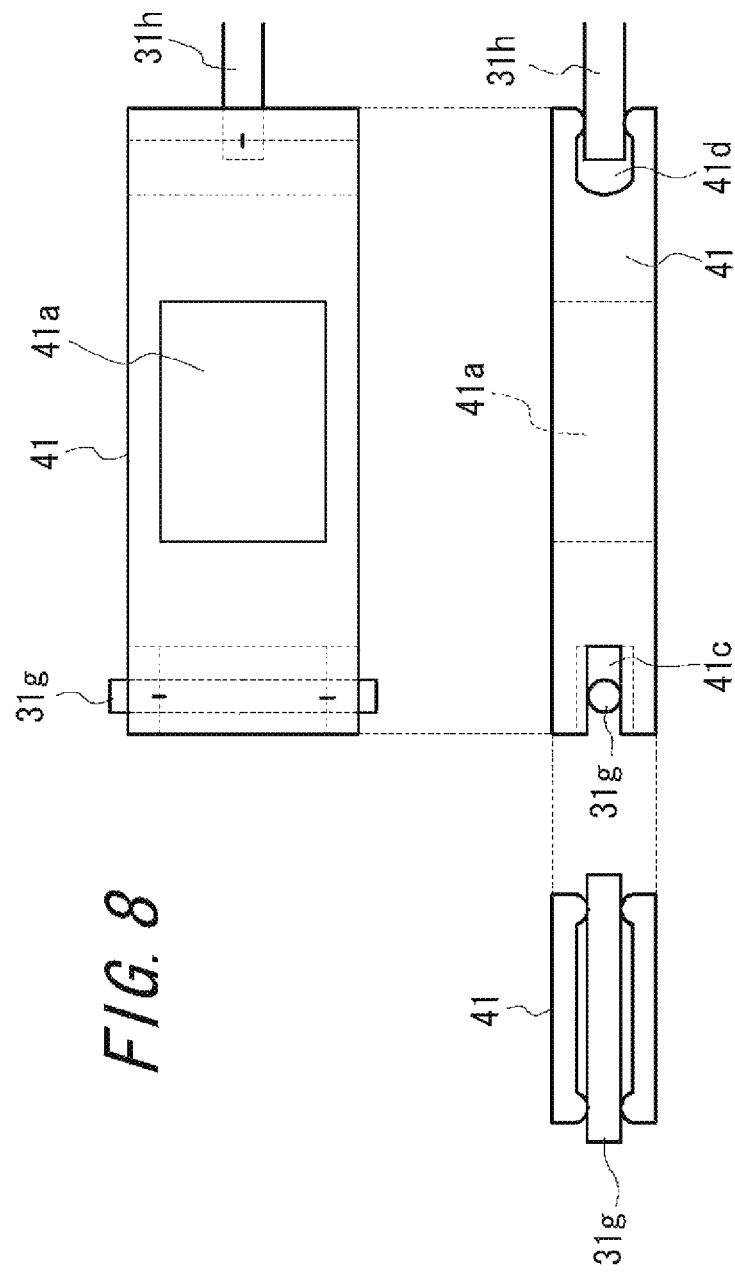
FIG. 8 is a view for illustrating a supporting structure for supporting, by a fixed member, a movable member in the image blur correcting device according to the first embodiment.

Further, on an end portion on the front left (in the X direction) of the image pickup element holder 41, a bearing portion 41c formed of an insertion groove extending in the Y direction is formed for passing the suspension shaft 31g through in the Y direction. Further, on the other end portion (in the negative X direction) of the image pickup element holder 41, there is formed a bearing portion 41d extending in the Y direction for supporting, in a manner of vertically sandwiching, the fore-end portion of the suspension shaft 31h extending toward inside of the base 31. As illustrated in FIG. 8, the bearing portion 41c has, in the vicinity of both ends thereof in the Y direction, a convex portion extending in the X direction, and slidably supports the suspension shaft 31g at two points where the convex portions come into contact with the suspension shaft 31g. Further, the bearing portion 41d has convex portions extending in the Y direction above and below, and slidably supports the suspension shaft 31h at one point where the convex portions come into contact with the suspension shaft 31h. As a result, the image pickup element holder 41 is slidably supported by the base 31 at three points. Therefore, the image pickup element holder 41 is capable of performing translational movements in the X and Y directions with respect to the base, and is also capable of performing rotational movements within a predetermined range.

Figure 4:
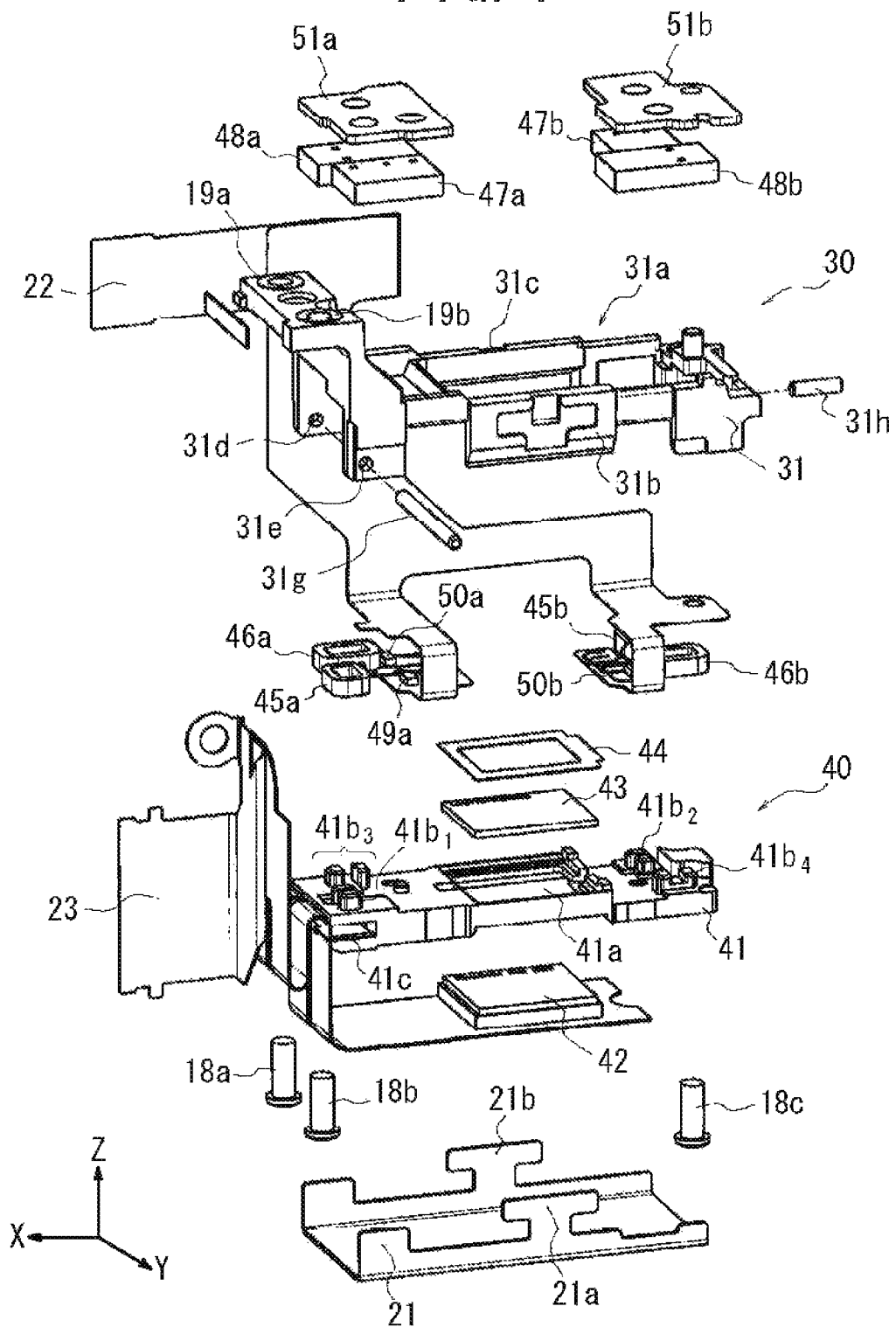
FIG. 4 is an exploded perspective view of the image blur correcting device according to the first embodiment viewed obliquely from above.
Figure 5:
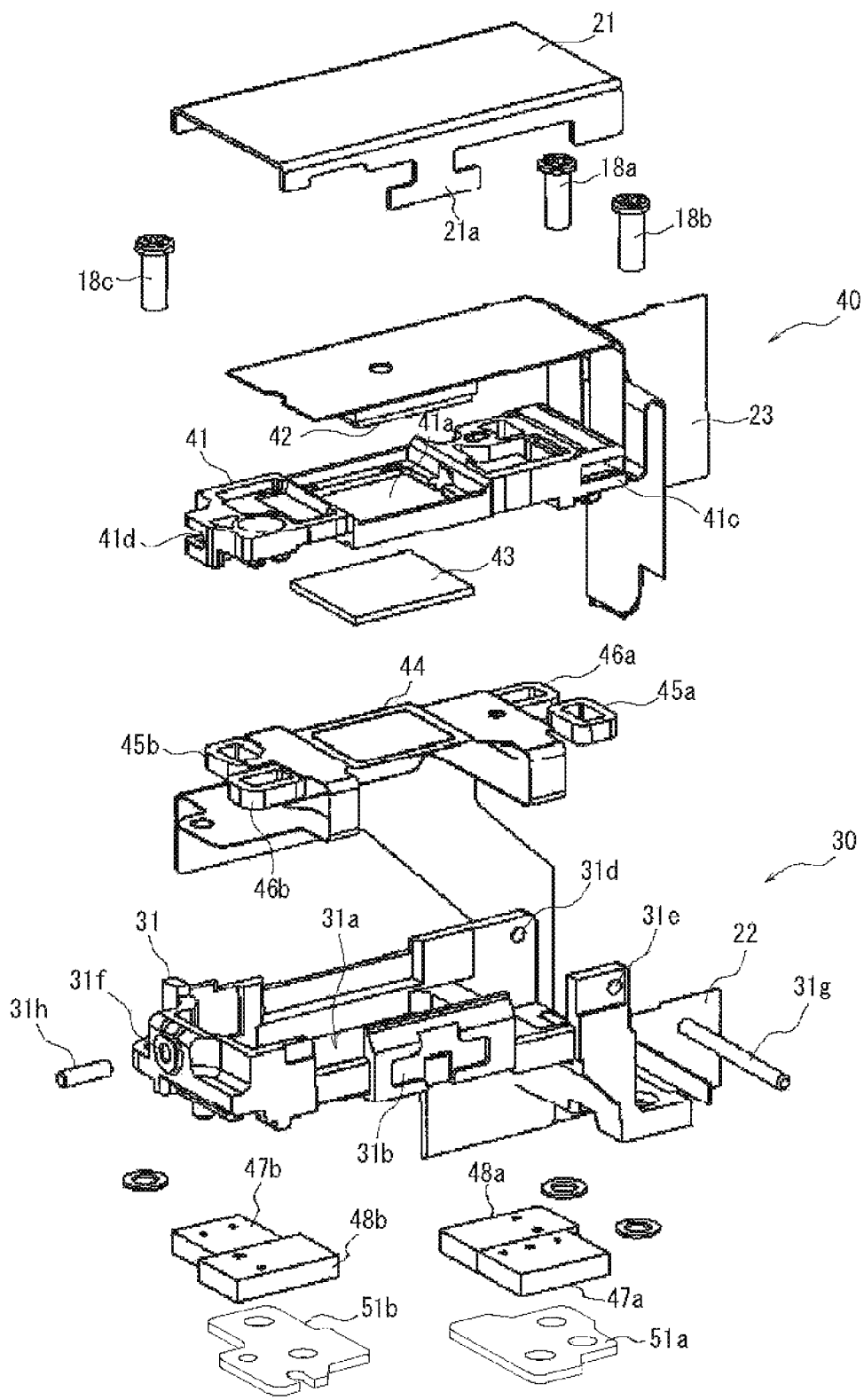
FIG. 5 is an exploded perspective view of the image blur correcting device according to the first embodiment viewed obliquely from below.
Figure 6:
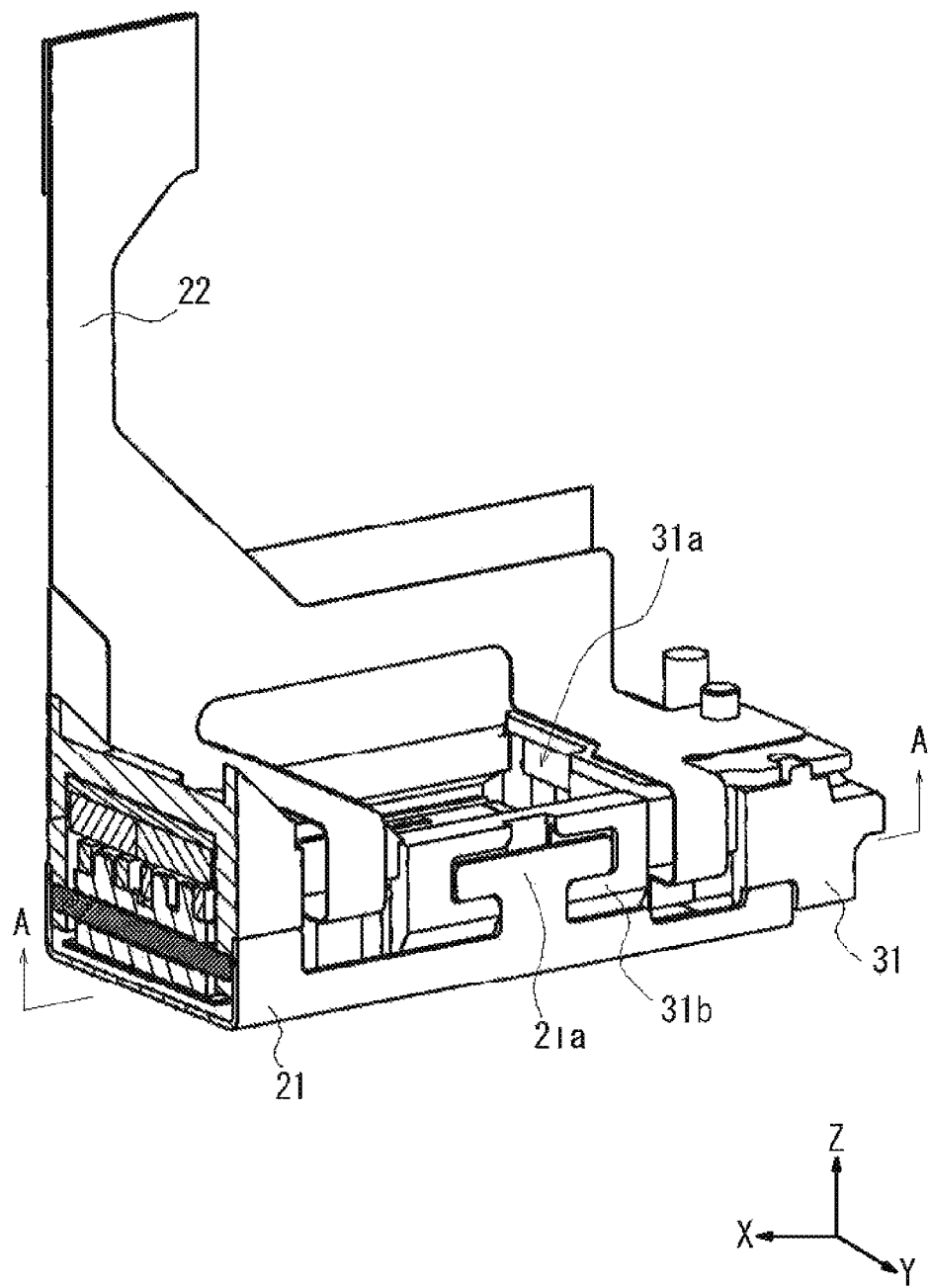
FIG. 6 is an outside perspective view of the image blur correcting device according to the first embodiment viewed obliquely from above.
Figure 7:
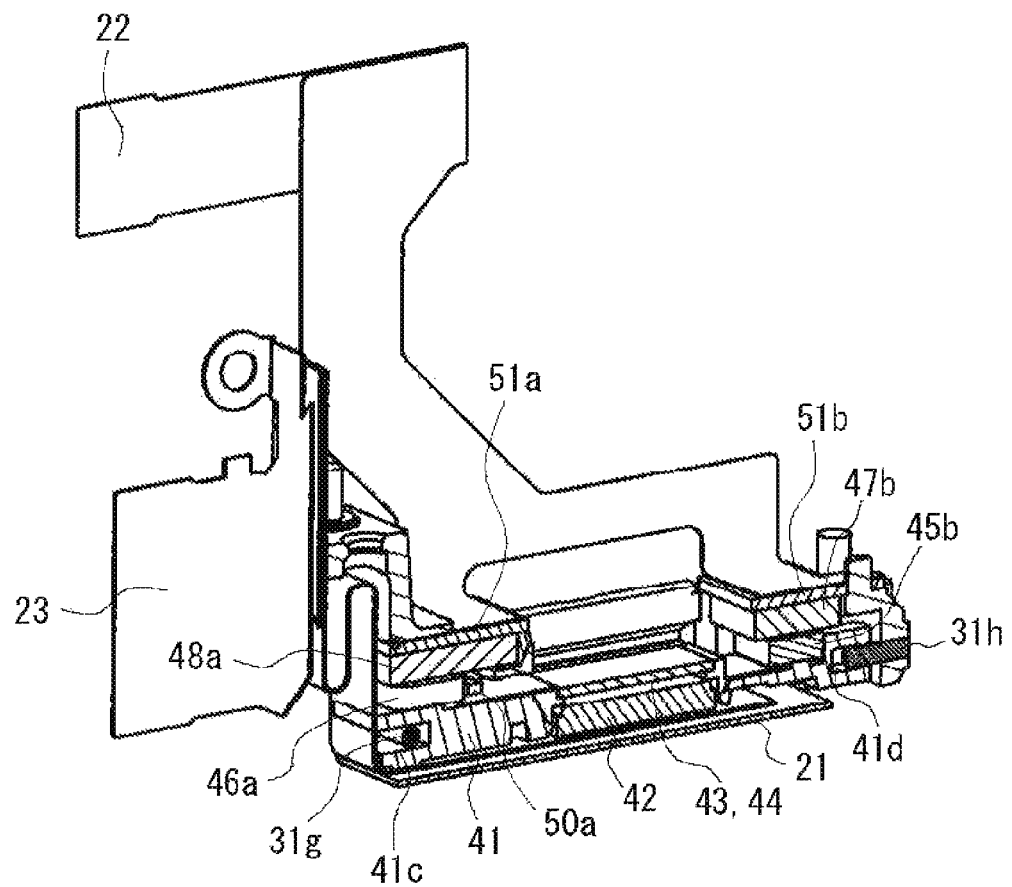
FIG. 7 is a sectional view of the image blur correcting device taken along the line A-A of FIG. 6.

The image pickup element 42 is fixed to the wind portion 41a of the image pickup element holder 41 from below with the light receiving surface of the image pickup element 42 facing upward in the XY plane, through soldering or the like (see FIGS. 4 and 7). The image pickup element 42 is arranged in such a manner that the center of the light receiving surface thereof perpendicularly intersects with the optical axis of the bending optical system of the image pickup lens unit 10. The image pickup element is controlled and image data is output by a control circuit (not shown) of the image pickup device via a flexible printed circuit board 23. Meanwhile, the cover glass 43 for protecting the light receiving surface of the image pickup element 42 is fixedly disposed so as to cover the light receiving surface from above the window portion 41a. Further, the cover glass sheet 44 for shielding unnecessary light is disposed on an upper surface of the cover glass.

The first coils 45a, 45b and the second coils 46a, 36b each are a coil that is wound in a rectangular shape in a direction along the XY plane. The first coils 45a, 45b are elongated in the Y direction while the second coils 46a, 46b are elongated in X direction. Hollow portions inside the wound windings are each fit in the fitting convex portions $41b_1$, $41b_2$, $41b_3$, $41b_4$, formed on the image pickup element holder 41, respectively, so as to be fixed.

Figure 9:
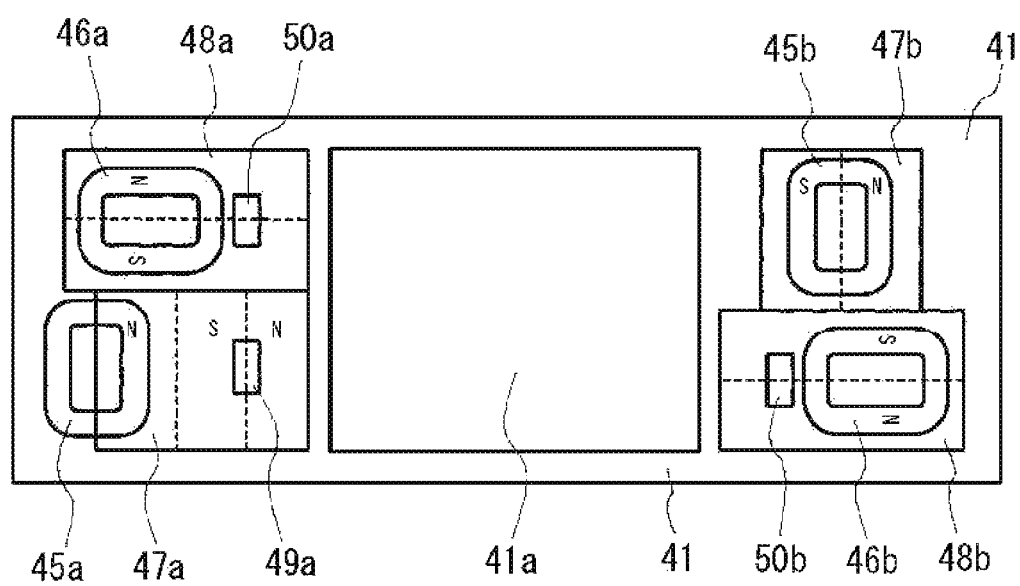
FIG. 9 is a diagram for illustrating drive means for driving the movable member in the image blur correcting device according to the first embodiment.
Figure 10:
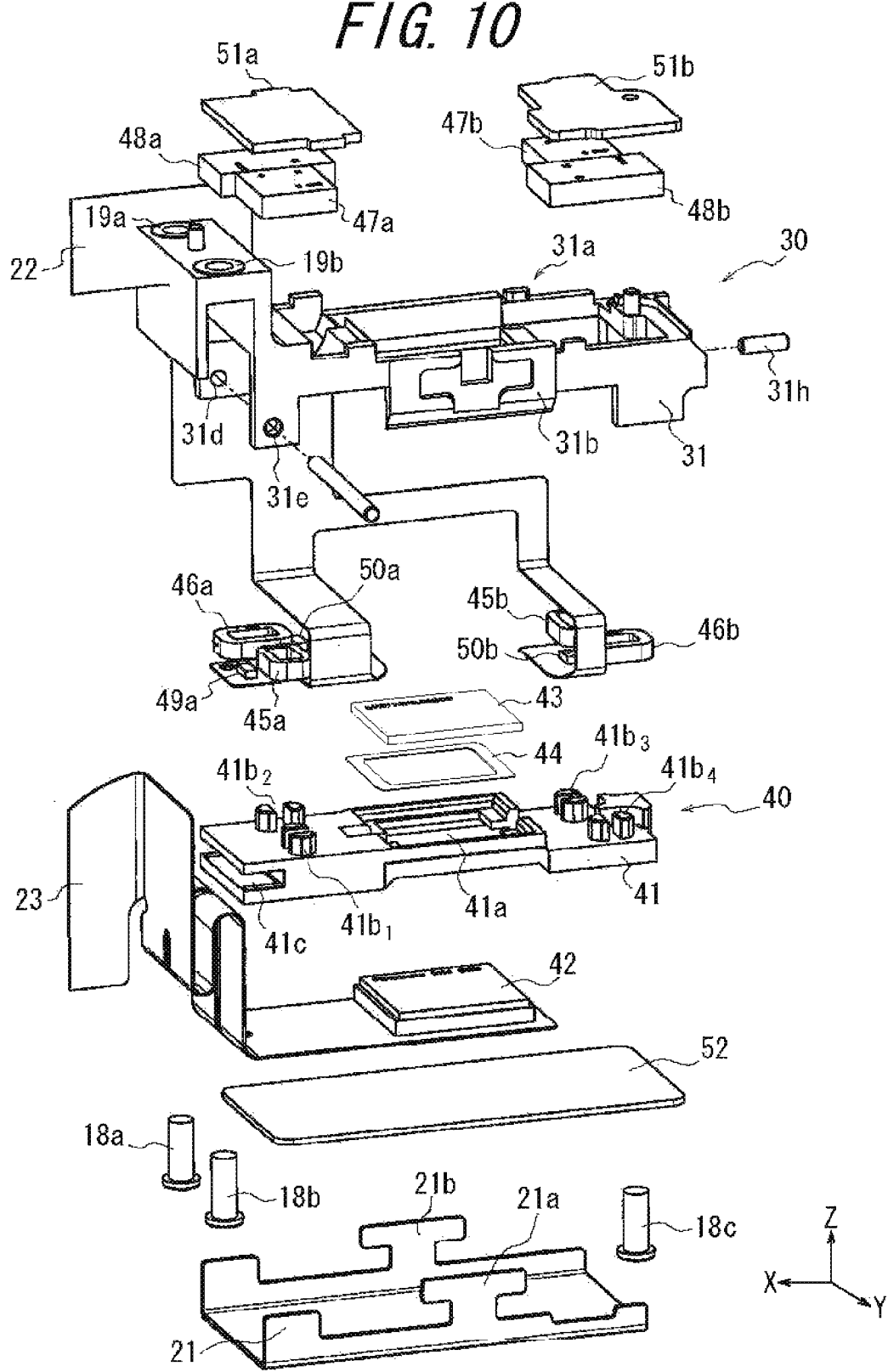
FIG. 10 is an exploded perspective view of an image blur correcting device according to a second embodiment.
Figure 11:
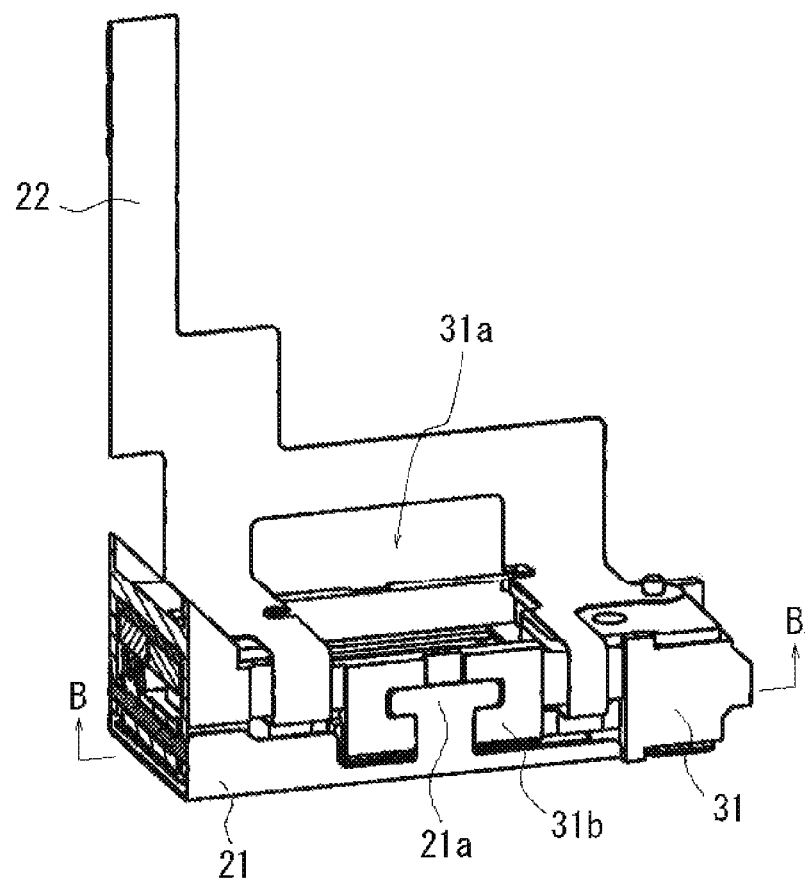
FIG. 11 is an outside perspective view of the image blur correcting device according to the second embodiment viewed obliquely from above.
Figure 12:
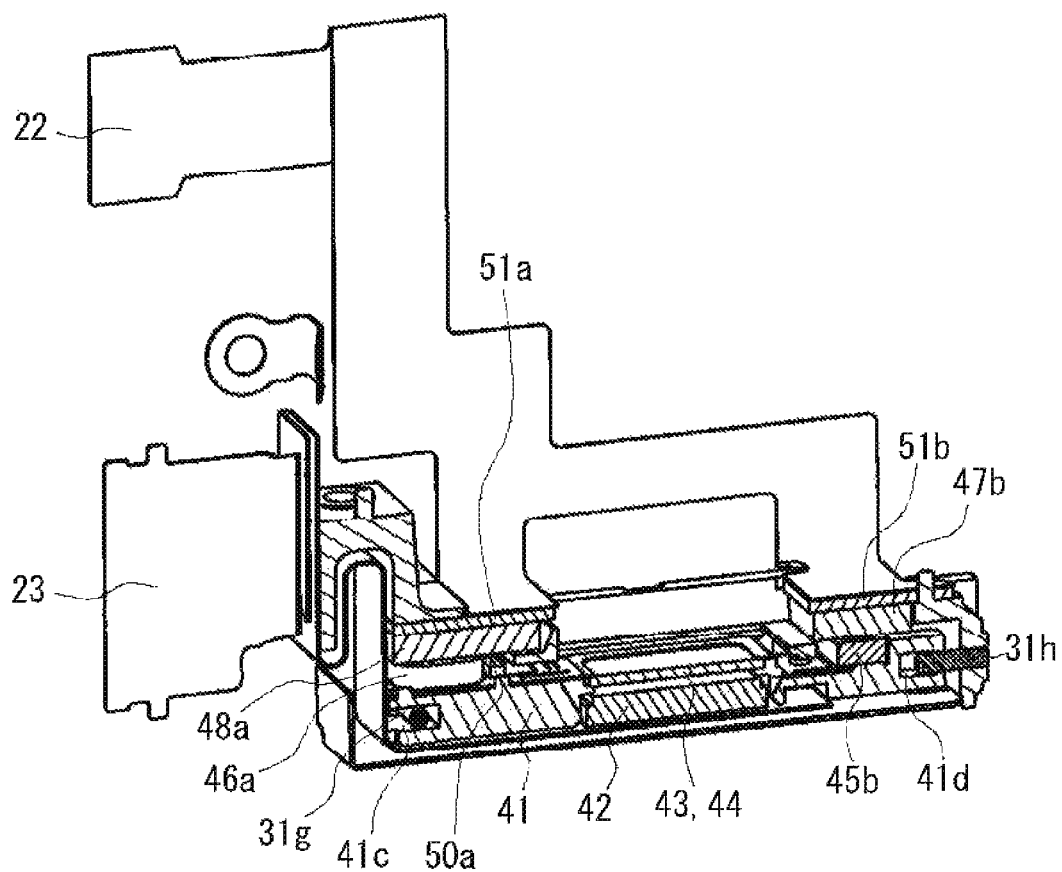
FIG. 12 is a sectional view of the image blur correcting device taken along the line B-B of FIG. 11.

FIG. 9 is a diagram illustrating a positional relation viewed from above (in the Z direction) among the first coils 45a, 45b, the second coils 46a, 46b, and the first Hall element 49a and the second Hall elements 50a, 50b arranged on the image pickup element holder 41, and the first magnets 47a, 47b and the second magnets 48a, 48b which are fixed to the base 31 and each arranged above the first coils 45a, 45b and the second coils 46a, 46b as being opposed thereto, respectively. The first coils 45a and the first magnet 47a, and the first coils 45b and the first magnet 47b each form first electromagnetic drive means, while the second coil 46a and the second magnet 48a, and the second coil 46b and the second magnet 48b each form second electromagnetic drive means.

A part of the first electromagnetic drive means formed of the first coil 45a and the first magnet 47a and a part of the second electromagnetic drive means formed of the second coil 46a and the second magnet 48a are aligned side by side in the Y direction on one of the sides (on the left in FIG. 9) extending along the Y-axis direction of the window portion 41a in which the image pickup element is disposed while another part of the first electromagnetic drive means formed of the first coil 45b and the first magnet 47b and another part of the second electromagnetic drive means formed of the second coil 46b and the second magnet 48b are aligned side by side in the Y direction on the other one of the sides (on the right in FIG. 9) extending along the Y-axis direction of the window portion 41a in which the image pickup element is disposed, and each part is arranged so as to fall within a range of the external width of the image pickup element in the Y-axis direction.

Further, the first magnets 47a, 47b and the second magnets 48a, 48b are magnetized in the Z direction (direction perpendicular to the paper plane of the drawing). The magnets are subjected to so-called heteropolar magnetization so as to be magnetized with N-poles and S-poles depending on the locations, rather than being simply magnetized with a single pole of one polarity on one surface. In FIG. 9, S and N each represent the polarity on a surface (lower surface) of the permanent magnets opposing to the corresponding coils.

As illustrated in FIG. 9, the first magnet 47a is subjected to heteropolar magnetization in parallel so as to have magnetic polarities of N, S, and N in the X direction on a surface on the coil side. Here, the center of the first coil 45a corresponds the position of an outermost magnet end surface of the first magnet 47a. Specifically, an outermost permanent magnet with N-pole from the image pickup element 41a is arranged so as to be opposed to a half-surface on one side of the first coil 45a in the X direction. In this state, when an electric current is applied to the first coil 45a, an electromagnetic force in the X direction is generated with respect to the first coil 45a due to the magnetic field in the vicinity of the first coil 45a and an electric current of the coil. As described above, even when only a half-surface on one side of the first coil 45a is opposed to the first magnet 47a, an equivalent magnetic field returning to the magnet 47a also exists on the other half-surface that is not opposed to the first magnet 47a, and hence a sufficient driving force can be obtained.

Further, the first magnet 47b is subjected to heteropolar magnetization in parallel in the X direction so that two surfaces different in magnetic polarity are opposed to the first coil 45b. When an electric current is applied to the first coil 45b, an electromagnetic force in the X direction is generated with respect to the first coil 45b. Still further, the second magnet 48a and the second magnet 48b are each subjected to heteropolar magnetization in parallel in the Y direction so that two magnetic poles different in magnetic polarity are opposed to the second coils 46a and 46b, respectively. When an electric current is applied to the second coils 46a, 46b, an electromagnetic force in the Y direction is generated with respect to each of the second coils 46a, 46b.

The first magnet 47b may be configured by including, similarly to the first magnet 47a, three magnets that are subjected to heteropolar magnetization, and the first coil 45b may be arranged so as to be opposed to a half-surface on one side of the outermost magnet, similarly to the first coil 45a. At this time, there is no need to dispose a Hall element to be opposed to the first magnet 47b. Alternatively, the coil turns of the first coil 45a may be increased, for example, twice as the coil turns of the first coil 45b, to thereby increase the driving force to be generated between the first coil 45a and the first magnet 47a.

The first Hall element 49a is a sensor for detecting a change in magnetic field in the X direction, and an output thereof corresponds to a relative displacement in the X direction with respect to the adjacent first magnet 47a. Further, the second Hall elements 50a and 50b each are a sensor for detecting a magnetic field in the Y direction, and an output thereof corresponds to relative displacements in the Y direction with respect to the adjacent second magnets 48a, 48b, respectively. These first Hall element 49a, and the second Hall elements 50a, 50b are arranged at positions each opposing to a boundary between the permanent magnets subjected to heteropolar magnetization, in order to detect displacements with maximum accuracy. The outputs from the first Hall element 49a and the second Hall elements 50a, 50b are transmitted to a control circuit (not shown), so as to allow detection of displacements of the image pickup element holder 41 in the X direction and Y direction. In addition, rotation of the image pickup element holder 41 can also be detected based on the difference in the displacement amount in the Y direction detected by the second Hall elements 50a and 50b. The results of such detection are used for drive control of displacement in the X direction and in the Y direction and rotation, which is described later.

Here, the first Hall element 49a is arranged so as to be opposed to a boundary between the permanent magnets closer to the image pickup element side of the first magnet 47a subjected to heteropolar magnetization. Specifically, the first Hall element 49a is arranged in parallel to the first coil 45a in the X direction. Such an arrangement makes it easier to dispose the first Hall element 49a and the first coil 45a within a range of the external width of the image pickup element 42 in the Y direction. The reason for disposing the first coil 45a further away from the image pickup element 42 is to make the image pickup element 42 less susceptible to the magnetic field generated by the first coil 45a.

The first coils 45a, 45b, the second coils 46a, 46b, the first Hall element 49a, and the second Hall elements 50a, 50b are connected, via a flexible printed circuit board 22, to a control board (not shown) mounted with a control circuit for controlling the entirety of the image pickup device 1. The first coils 45a and 45b are unilaterally controlled by the control circuit, while the second coils 46a and 46b are independently controlled by the control circuit. With this configuration, a driving force in the X direction is generated through application of an electric current to the first coils 45a, 45b, to thereby control displacement of the image pickup element holder 41 in the X direction with respect to the base 31. Further, the second coils 46a and 46b are independently controlled so as to pass an electric current therethrough, to thereby control displacement in the Y direction and rotation of the image pickup element holder 41 with respect to the base 31.

With the above-mentioned configuration, when the release button 3 is operated by a user using the image pickup device 1 for image taking, a detector such as a gyro sensor transmits a signal according to the generation of camera shake, to the control circuit. In accordance with the camera shake thus detected, the control circuit performs drive control of the first coils 45a, 45b and the second coils 46a, 46b so as to move and rotate the image pickup element in the XY plane, to thereby correct the image blur.

According to the present invention, the first and second electromagnetic drive means are each arranged on one of the sides extending along the Y direction of the image pickup element when viewed in the direction perpendicular to the light receiving surface of the image pickup element. As a result, as compared to a case where the electromagnetic drive means is also disposed on a side extending along the X direction, the coil or the magnet in this configuration can be arranged without being significantly extended in the X direction, which makes it possible to downsize the image blur correcting device. Further, the first and second electromagnetic drive means are arranged within the external width of the image pickup element in the Y direction, so as to limit the width of the image blur correcting device in the Y direction to fall within a range substantially the same as the external width of the image pickup element in the Y direction, which makes it possible to provide a further smaller image blur correcting device. Further, when the image blur correcting device according to this embodiment is applied to an image pickup device, the image pickup device can be configured further smaller in size and thickness. Though the first magnets 47a, 47b and the second magnets 48a, 48b are subjected to heteropolar magnetization in this embodiment, magnets that are subjected to heteropolar adhesion through adhesion with the N-pole and the S-pole thereof being opposed to each other may also be used.

<Second Embodiment>

In the following, an image blur correcting device according to a second embodiment of the present invention is described with reference to FIGS. 10 to 13. The image blur correcting device of this embodiment has a feature in that it is different in configuration of the coil, the magnet, and the Hall element for driving the movable member, as compared to the image blur correcting device according to the first embodiment.

In this embodiment, a yoke 52 is disposed on the back side (lower side in FIG. 10) of the image pickup element 42 as being opposed to the first magnets 47a, 47b and the second magnets 48a, 48b. The yoke 52 is formed of iron as a magnetic body. The yoke 52 prevents downward leakage of a magnetic flux from the lower surface of the image pickup device 1 while focusing magnetic fluxes generated by the magnets to the coils, to thereby contribute to the downsizing of the image blur correcting device as a whole.

Further, this embodiment is different from the first embodiment in that the cover glass sheet 44 is disposed between the cover glass 43 and the image pickup element 42. The cover glass sheet 44 serves to define the effective range of the light receiving surface of the image pickup element 42, and there is no substantial difference in the effect of the image blur correcting device even when the cover glass 43 and the cover glass sheet 44 are disposed in a different order as described above.

Figure 13:
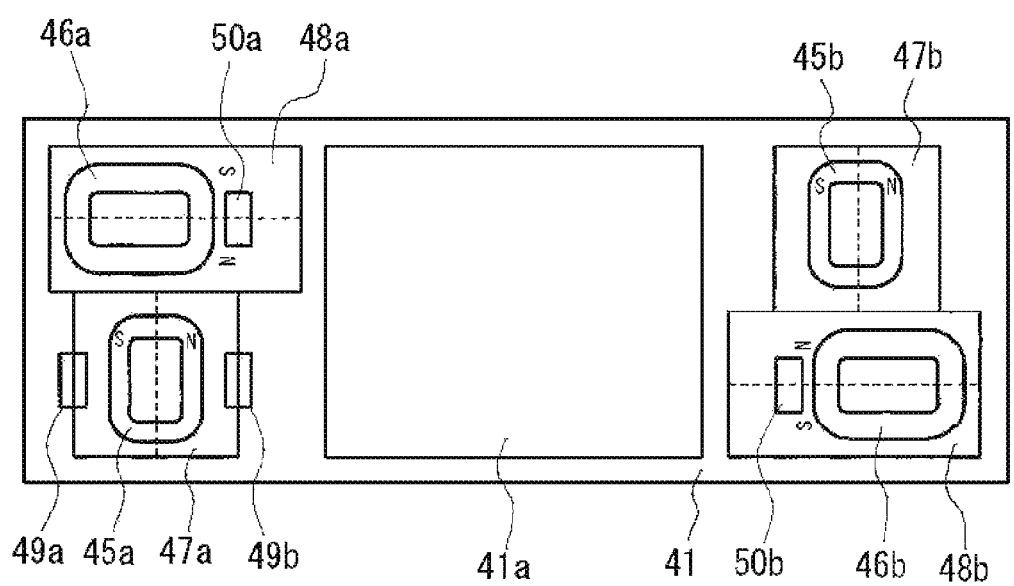
FIG. 13 is a diagram for illustrating a movable member drive means in the image blur correcting device according to the second embodiment.

Next, the arrangement and the configuration of the coil, the magnet, and the Hall element are described. FIG. 13 is a diagram illustrating a positional relation viewed from above (in the Z direction) among the first coils 45a, 45b, the second coils 46a, 46b, and the first Hall elements 49a, 49b and the second Hall elements 50a, 50b arranged on the image pickup element holder 41, and the first magnets 47a, 47b and the second magnets 48a, 48b which are fixed to the base 31 and each arranged above the first coils 45a, 45b and the second coils 46a, 46b as being opposed thereto, respectively. In FIG. 13, S and N each represent the polarity on a surface (lower surface) of the permanent magnets opposing to the corresponding coils. The first magnets 47a, 47b and the second magnets 48a, 48b are magnetized in the Z direction (direction perpendicular to the paper plane of the drawing). The magnets are subjected to so-called heteropolar magnetization so as to be magnetized with N-poles and S-poles depending on the locations, rather than being simply magnetized with a single pole of one polarity on one surface.

As compared to the first embodiment, this embodiment is different in configuration of the first coil 45a for X-direction driving, the first magnet 47a opposing to the first coil 45a, and the first Hall elements 49a, 49b arranged correspondingly to the first coil 45a as being opposed to the first magnet 47a. Specifically, the first magnet 47a of this embodiment is formed of two permanent magnets similar to those of the first magnet 47b, which are arranged in the X direction and subjected to heteropolar magnitization, and the first coil 45a and the first magnet 47a are arranged at positions point-symmetrical to the first coil 45b and the first magnet 47b, with respect to the center of the window portion 41a. Further, two first Hall elements 49a and 49b are arranged, as Hall elements for detecting displacement in the X direction, on both ends (on opposing two sides extending long the Y direction) of the first magnet 47a in the X direction.

Since the other configuration and effects are similar to those of the first embodiment, the same constituent elements are denoted by the same reference symbols, and the description thereof is omitted.

In this embodiment, the first magnet 47a is magnetized with two poles arranged side by side, rather than with three poles arranged side by side, so as to make the configuration simpler. Further, the magnets and the coils that are substantially the same in size are arranged at point-symmetrical positions with respect to the center of the window portion 41a in which the image pickup element is disposed, so that the device is well balanced and easy to control.

It should be noted that the present invention is not limited only to the above-mentioned embodiments, and various modifications and alterations can be made thereto. For example, the image pickup device is not limited to the one that has the bending optical system, and may include a straight optical system.

Further, according to the first and second embodiments, the first electromagnetic drive means for X-direction driving and the second electromagnetic drive means for Y-direction driving are arranged on both sides along the Y direction of the image pickup element. However, one each of the first electromagnetic drive means and the second electromagnetic drive means may be arranged, or one of the first and second electromagnetic drive means and two or the other one of the first and second electromagnetic drive means may be arranged. Alternatively, three or more of the electromagnetic drive means may be arranged on one of the sides.

First, according to the first and second embodiments, the first electromagnetic drive means and the second electromagnetic drive means are arranged so as to be located within a range of the external width of the image pickup element in the Y direction. However, the first and second electromagnetic drive means may also be arranged at a position outside the range as long as being arranged on any one of the sides along the Y direction. In such a case, there may be provided an image blur correcting device reduced in size as compared to the case where the electromagnetic drive means are arranged on both of the sides along the X direction and the sides along the Y direction.

Further, the electromagnetic drive means is configured by including a movable member having a coil arranged thereon and a fixed member having a magnet arranged thereon. Alternatively, the electromagnetic drive means may also be configured by including a fixed member having a coil arranged thereon and a movable member having a magnet arranged thereon.

Further, according to the first and second embodiments, two of the first coils for X-direction driving are unilaterally controlled while two of the second coils for Y-direction driving are independently controlled. However, the present invention is not limited thereto. The first coils may also be independently controlled, similarly to the second coils. Alternatively, the first coils may be independently controlled while the second coils may be unilaterally controlled. Still alternatively, in the case where the rotation of the image pickup element is not subjected to control, two of the first coils and two of the second coils may be unilaterally controlled, respectively.

Description of Symbols 1 image pickup device
2 flash
3 release button
10 image pickup lens unit
11 lens aperture
12 mirror flame
13 flexible printed circuit board
18a to 18c screw
19a, 19b screw holes
20 image blur correcting device
21 cover
21a, 21b fitting piece
22 flexible printed circuit board
23 flexible printed circuit board
30 fixed member
31 base
31a opening
31b, 31c fitting portion
31d, 31e, 31f shaft hole
31g suspension shaft
31h suspension shaft
40 movable member
41 image pickup element holder
41a window portion
41b fitting convex portion
41c bearing portion
41d bearing portion
42 image pickup element
43 cover glass
44 cover glass sheet
45a, 45b first coil (for x-direction driving)
46a, 46b second coil (for Y-direction driving)
47a, 47b first magnet (for X-direction driving)
48a, 48b second magnet (for Y-direction driving)
49a, 49b first Hall element (for X-position detection)
50a, 50b second Hall element (for Y-position detection)
51a, 51b, 52 yoke

The invention claimed is:

1. An image blur correcting device, comprising:
an image pickup element having a rectangular external shape;
a movable member that is capable of moving in a first direction orthogonal to an optical axis of an image pickup lens and in a second direction orthogonal to the optical axis and to the first direction, and has the image pickup element placed thereon in such a manner that two mutually orthogonal sides of the external shape extend along the first direction and the second direction;
a fixed member for supporting the movable member in a movable manner in the first direction and in the second direction; and
two first electromagnetic drive means and two second electromagnetic drive means each for driving the movable member, with respect to the fixed member, in the first direction and in the second direction,
one of the first electromagnetic drive means and one of the second electromagnetic drive means are aligned side by side on one of the two mutually orthogonal sides and along the second direction, and the other of the first electromagnetic drive means and the other of the second electromagnetic drive means are aligned side by side on a third side of the rectangular external shape and along the second direction, when viewed in a direction perpendicular to a light receiving surface of the image pickup element,
wherein the third side is opposite the one of the two mutually orthogonal sides,
wherein the fixed member has a plurality of guide shafts,
wherein the movable member has a plurality of bearing portions having the plurality of guide shafts passed therethrough,
wherein the bearing portions abut to outer peripheries of the guide shafts at three points when viewed in the direction perpendicular to the light receiving surface of the image pickup element, so that the fixed member slidably supports the movable member,
wherein the two first electromagnetic drive means are each provided with a first coil disposed on the movable member and first magnets formed of a plurality of permanent magnets which are disposed on the fixed member so as to be opposed to the first coil and are arranged side by side in the first direction as being subjected to heteropolar bonding; and
wherein the two second electromagnetic drive means are each provided with a second coil disposed on the movable member and a second magnet formed of a plurality of permanent magnets which are disposed on the fixed member so as to be opposed to the second coil and are arranged side by side in the second direction as being subjected to heteropolar bonding;
image blur correcting device further comprising:
a first Hall element disposed on the movable member so as to be opposed to either of the first magnets; and
two second Hall elements disposed on the movable member so as to be opposed to each of the second magnets,
wherein the first magnets respectively include a plurality of permanent magnets subjected to heteropolar bonding, a number of the permanent magnets in one of the first magnets being different from a number of the permanent magnets in the other of the first magnets; and
wherein the first coil being opposed to the one or the other of the first magnets having a larger number of the permanent magnets coincides, in the center thereof, with a position of an end surface of an outermost permanent magnet, the outermost permanent magnet being included in the one or the other of the first magnets to which the first coil is opposed, and the first Hall element and the second Hall elements are arranged so as to be opposed to a boundary of the heteropolar bondings, when the center of the light receiving surface of the image pickup element intersects with the optical axis of the image pickup lens, when viewed from a direction along the optical axis.

2. The image blur correcting device according to claim 1, wherein one of the first electromagnetic drive means and one of the second electromagnetic drive means are arranged side by side in the second direction while the other one of the first electromagnetic drive means and the other one of the second electromagnetic drive means are arranged at positions point-symmetrical to the one of the first electromagnetic drive means and the one of the second electromagnetic drive means, with respect to the center of the image pickup element; and wherein the first electromagnetic drive means and the second electromagnetic drive means are arranged at positions all falling within a width of the external shape of the image pickup element in the second direction.

3. An image pickup device, comprising:
a detector for detecting camera shake; and
the image blur correcting device according to claim 1,
wherein the first electromagnetic drive means and the second electromagnetic drive means are controlled based on an output from the detector.

4. The image blur correcting device according to claim 1,
wherein the three points at which the bearing portions abut to the outer peripheries of the guide shafts consist of:
two points at which one of the bearing portions having a convex portion extending in the first direction abut to a first guide shaft, and
one point at which another one of the bearing portions having a convex portion extending in the second direction abut to a second guide shaft.

* * * * *